(12) United States Patent
Noguchi

(10) Patent No.: US 11,067,799 B2
(45) Date of Patent: Jul. 20, 2021

(54) DISPLAY DEVICE

(71) Applicant: SEIKO EPSON CORPORATION, Tokyo (JP)

(72) Inventor: Toshiyuki Noguchi, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 38 days.

(21) Appl. No.: 15/813,775

(22) Filed: Nov. 15, 2017

(65) Prior Publication Data

US 2018/0149866 A1    May 31, 2018

(30) Foreign Application Priority Data

Nov. 25, 2016 (JP) .............................. JP2016-228638

(51) Int. Cl.
*G02B 5/18* (2006.01)
*G02B 27/01* (2006.01)
(Continued)

(52) U.S. Cl.
CPC ..... *G02B 27/0101* (2013.01); *G02B 26/0808* (2013.01); *G02B 27/0172* (2013.01); *G02B 27/42* (2013.01); *G02B 2027/0178* (2013.01)

(58) Field of Classification Search
CPC ............... G02B 27/01; G02B 27/0101; G02B 27/0172; G02B 27/42; G02B 27/0103; G02B 27/4205; G02B 27/1086; G02B 27/4272; G02B 27/4277; G02B 27/4288; G02B 27/4294; G02B 27/44; G02B 27/10; G02B 27/1006; G02B 27/1013; G02B 27/14; G02B 27/148; G02B 27/0938;
(Continued)

(56) References Cited

U.S. PATENT DOCUMENTS 7,641,342 B2 * 1/2010 Eberl ....................... A61B 3/14
                                                          351/221
2002/0135830 A1    9/2002 Endo et al.
(Continued)

FOREIGN PATENT DOCUMENTS

JP    H09-127336 A    5/1997
JP    2001-004956 A    1/2001
(Continued)

*Primary Examiner* — Stephone B Allen
*Assistant Examiner* — Jyotsna V Dabbi
(74) *Attorney, Agent, or Firm* — Oliff PLC

(57) ABSTRACT

A display device includes a first diffraction element that diffracts light emitted from a light source section in front of an observer such that the light is directed to an eye of the observer, and a second diffraction element that is disposed in an optical path from the light source to the first diffraction element to diffract the light such that the light is directed to the first diffraction element. The first diffraction element has a wider wavelength width than the second diffraction element at the half value of diffraction efficiency with respect to light in a first wavelength range, a second wavelength range, and a third wavelength range. This structure reduces a decrease in intensity of the light diffracted by the second diffraction element and the first diffraction element even if a wavelength at which diffraction efficiency is maximum is shifted in the first diffraction element.

4 Claims, 7 Drawing Sheets

(51) Int. Cl.
*G02B 26/08* (2006.01)
*G02B 27/42* (2006.01)

(58) Field of Classification Search
CPC .. G02B 27/0944; G02B 27/145; G02B 27/22; G02B 2027/0178; G02B 2027/0105–0107; G02B 26/08; G02B 26/0808; G02B 5/32; G02B 5/18
USPC ........................................................ 359/566
See application file for complete search history.

(56) References Cited

U.S. PATENT DOCUMENTS

| | | |
|---|---|---|
| 2006/0228073 A1 | 10/2006 | Mukawa et al. |
| 2006/0268421 A1 | 11/2006 | Shimizu et al. |
| 2007/0242237 A1* | 10/2007 | Thomas ............... H04N 13/363 353/94 |
| 2008/0239424 A1 | 10/2008 | Mukawa et al. |
| 2009/0141324 A1* | 6/2009 | Mukawa ............... G02B 5/1814 359/13 |
| 2009/0303212 A1* | 12/2009 | Akutsu ................. G02B 5/203 345/204 |
| 2010/0220295 A1 | 9/2010 | Mukawa et al. |
| 2011/0211239 A1 | 9/2011 | Mukawa et al. |
| 2012/0081789 A1 | 4/2012 | Mukawa et al. |
| 2012/0206811 A1 | 8/2012 | Mukawa et al. |
| 2013/0106847 A1* | 5/2013 | Sugiyama ............ G03H 1/2294 345/419 |
| 2013/0155513 A1 | 6/2013 | Mukawa et al. |
| 2013/0222384 A1* | 8/2013 | Futterer .............. G02B 6/0016 345/426 |
| 2015/0355467 A1 | 12/2015 | Mukawa et al. |
| 2016/0170215 A1 | 6/2016 | Mukawa et al. |

FOREIGN PATENT DOCUMENTS

| | | |
|---|---|---|
| JP | 2002-277816 A | 9/2002 |
| JP | 2007-052086 A | 3/2007 |
| JP | 2008-058776 A | 3/2008 |
| JP | 2014-112245 A | 6/2014 |

* cited by examiner

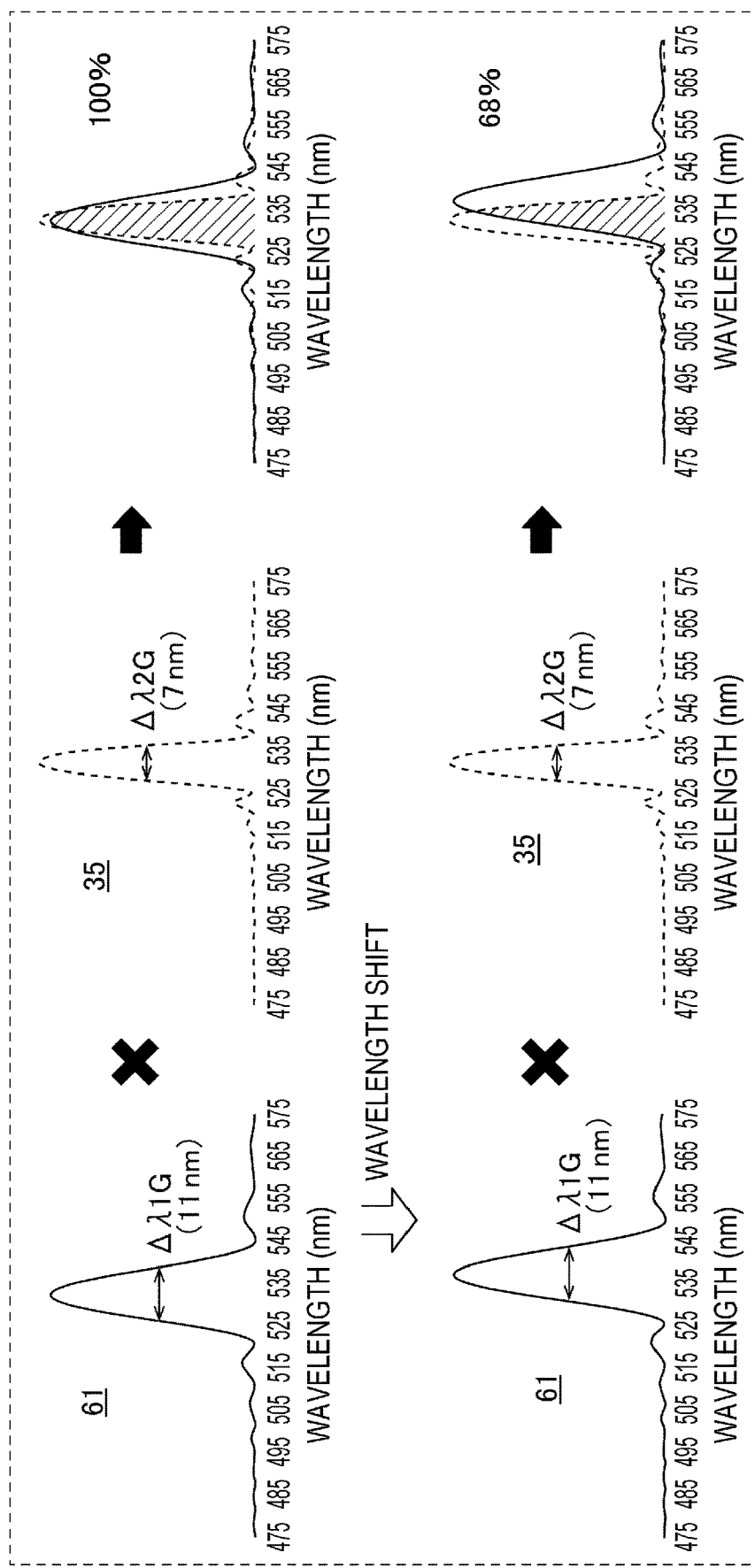

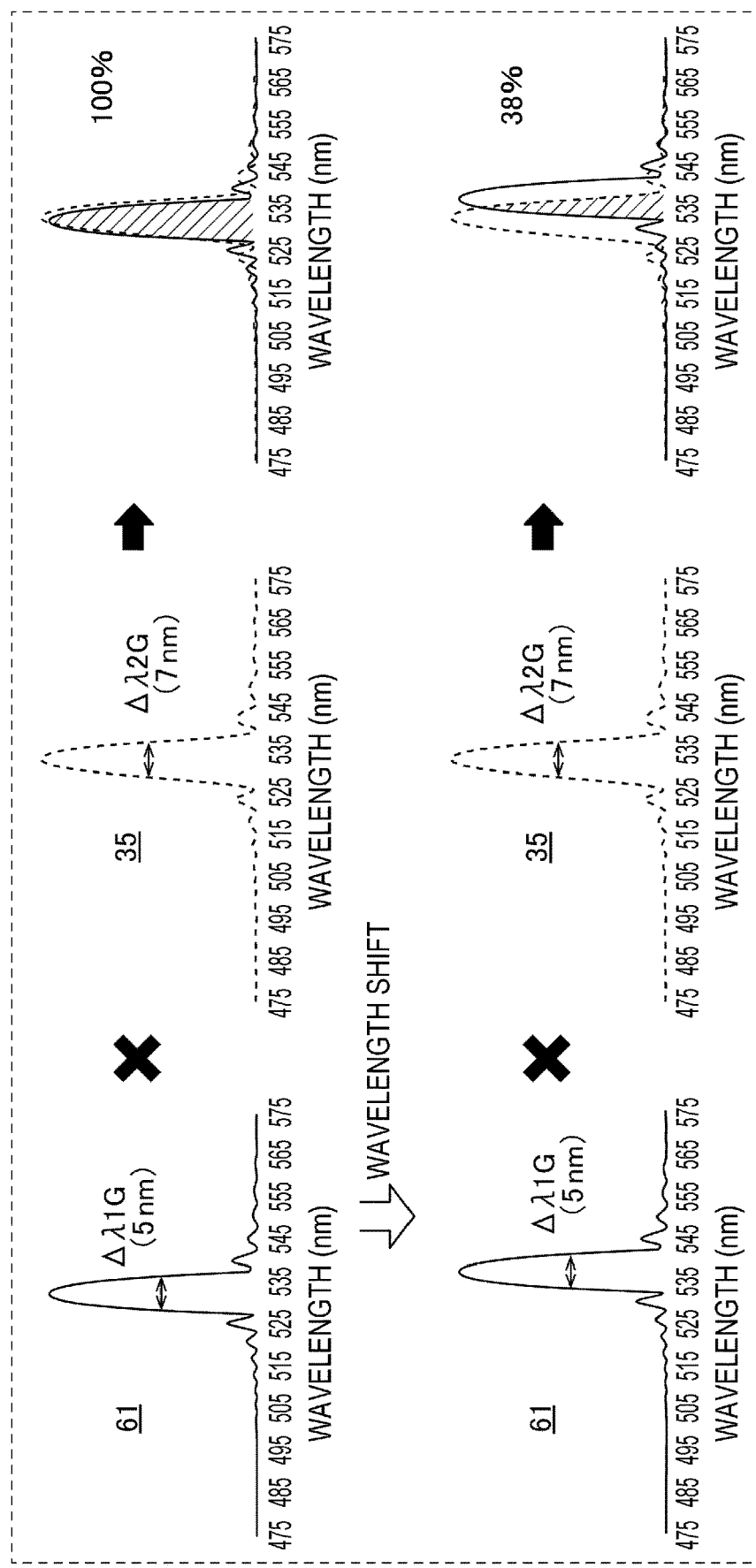

DISPLAY DEVICE

BACKGROUND

1. Technical Field

The present disclosure relates to a display device.

2. Related Art

Some display devices use a diffraction element to deflect light that has been emitted from a light source. Such a diffraction element is optimized for the highest diffraction efficiency at a specific wavelength by adjusting the pitch of the interference fringes. For color display, a diffraction element in a display device diffracts red light, green light, and blue light. For example, in a display device described in JP-A-2007-52086, the pitches of the interference fringes are optimized such that the highest diffraction efficiency can be achieved with respect to the red, green, and blue light. JP-A-2007-52086 proposes that in the display device, in each of the respective wavelength ranges corresponding the red, green, and blue light, the wavelength width at the half value of the light intensity of the light emitted from the light source be wider than the wavelength width at the half value of the diffraction efficiency of the diffraction grating.

Some of the display devices that use a diffraction element deflect light that has been emitted from a light source by using a first diffraction element and a second diffraction element, which is disposed between the light source and the first diffraction element. In such a case, the first diffraction element and the second diffraction element are configured to have the same wavelength at which diffraction efficiency is maximum and the same wavelength width at the half value of diffraction efficiency. However, if the wavelength at which diffraction efficiency is maximum is shifted due to variations in shrinkage ratio of the hologram material in the exposure step in manufacturing the diffraction elements, change in temperature in the environment in which the display device is used, and the like, the same wavelength width at the half value of diffraction efficiency of the first diffraction element and the second diffraction element decreases the diffraction efficiency similarly in both the first diffraction element and the second diffraction element, and thereby the quality of the images is decreased largely, for example, due to the darkening of images. It is difficult to solve such problems even if the structure described in the JP-A-2007-52086 is employed.

SUMMARY

An advantage of some aspects of the embodiment is that there is provided a display device capable of displaying a high-quality image by using a first diffraction element and a second diffraction element having optimized diffraction characteristics even if a wavelength at which diffraction efficiency is maximum is shifted.

To solve the above-mentioned problems, according to an aspect of the embodiment, a display device configured to deflect light emitted from a light source section by a first diffraction element and a second diffraction element that is disposed in an optical path from the light source section to the first diffraction element is provided. One of the first diffraction element and the second diffraction element has a wider wavelength width than the other diffraction element at the half value of diffraction efficiency with respect to light in a first wavelength range.

In this aspect, the first diffraction element and the second diffraction element have different wavelength widths at the half value of diffraction efficiency with respect to light in a first wavelength range. Accordingly, in the diffraction element that has the wider wavelength width at the half value of diffraction efficiency with respect to the light in the first wavelength range, even if a wavelength at which diffraction efficiency with respect to the light in the first wavelength range is maximum is shifted, the decrease in intensity of the light in the first wavelength range deflected by the second diffraction element and the first diffraction element can be reduced, and thereby the darkening of images can be prevented.

In this display device, the first diffraction element may have a wider wavelength width than the second diffraction element at the half value of diffraction efficiency with respect to light in the first wavelength range. With this structure, even if the first diffraction element, which is disposed at a position close to the observer's eye, tends to be subject to a wavelength shift compared with the second diffraction element, when a wavelength at which diffraction efficiency is maximum is shifted in an optical path from the light source to an eye of an observer, the decrease in the intensity of the light in the first wavelength range that has been deflected by the second diffraction element and the first diffraction element can be reduced. Accordingly, the darkening of images can be prevented and high-quality images can be displayed.

In this display device, the one diffraction element may be thinner than the other diffraction element. With this structure, even if the one diffraction element tends to be subject to a shift of the wavelength at which diffraction efficiency with respect to the light in the first wavelength range is maximum due to the thin structure, the darkening of images can be prevented and high-quality images can be displayed.

In this display device, the one diffraction element may be larger than the other diffraction element. With this structure, even if the one diffraction element tends to be subject to a shift of a wavelength at which diffraction efficiency with respect to the light in the first wavelength range is maximum due to the large structure, the darkening of images can be prevented and high-quality images can be displayed.

In this display device, the one diffraction element may have a wider wavelength width than the other diffraction element at the half value of diffraction efficiency with respect to the light in a second wavelength range that is different from the first wavelength range.

In this display device, each of the one diffraction element and the other diffraction element may have a plurality of interference fringes with different pitches.

BRIEF DESCRIPTION OF THE DRAWINGS

The embodiment will be described with reference to the accompanying drawings, wherein like numbers reference like elements.

FIG. 7 is a wavelength shift occurred in the first diffraction element illustrated in FIG. 5 and other drawings.

FIG. 8 is another wavelength shift occurred in the first diffraction element illustrated in FIG. 5 and other drawings.

DESCRIPTION OF EXEMPLARY EMBODIMENTS

Hereinafter, embodiments will be described. In the following description, as a display device including a first diffraction element and a second diffraction element, an example display device will be mainly described; the display device includes a first diffraction element that diffracts the light that has been emitted from a light source in front of an observer such that the light is directed to an eye of the observer, and a second diffraction element that is disposed in an optical path from the light source to the first diffraction element to diffract the light such that the light is directed to the first diffraction element.

In the following description, an up-down direction is an X direction, a lateral direction is a Y direction, and a front-back direction is a Z direction, and X, Y, and Z are used to denote the up-down direction, the lateral direction, and the front-back direction, respectively. Furthermore, in the following description, when an incident light is diffracted and output from the same plane of a diffraction element, it is described as "reflection". Example of display device structure FIG. 1 an external view of a display device 100 according to an embodiment. FIG. 2 illustrates an optical system of the display device 100 according to the embodiment.

Figure 1:
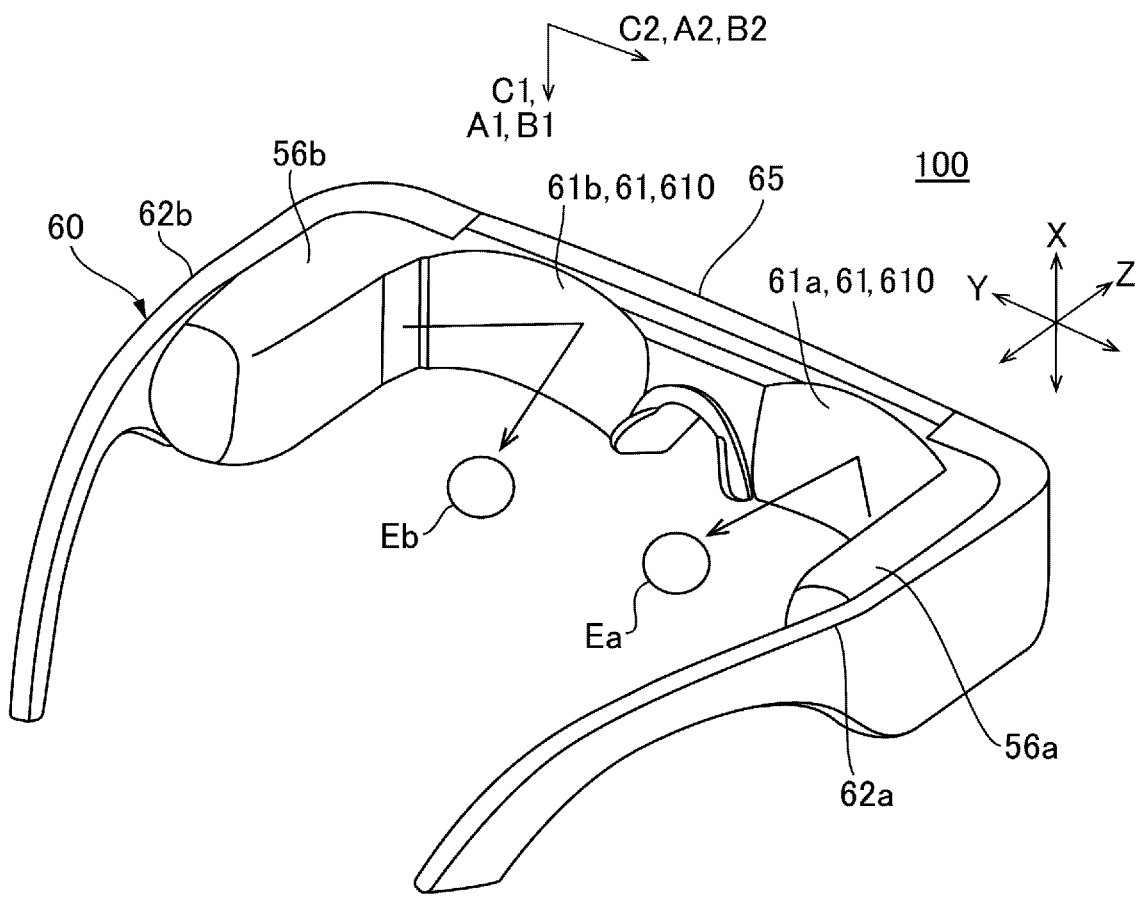
FIG. 1 is an external view of a display device according to an embodiment.
Figure 2:
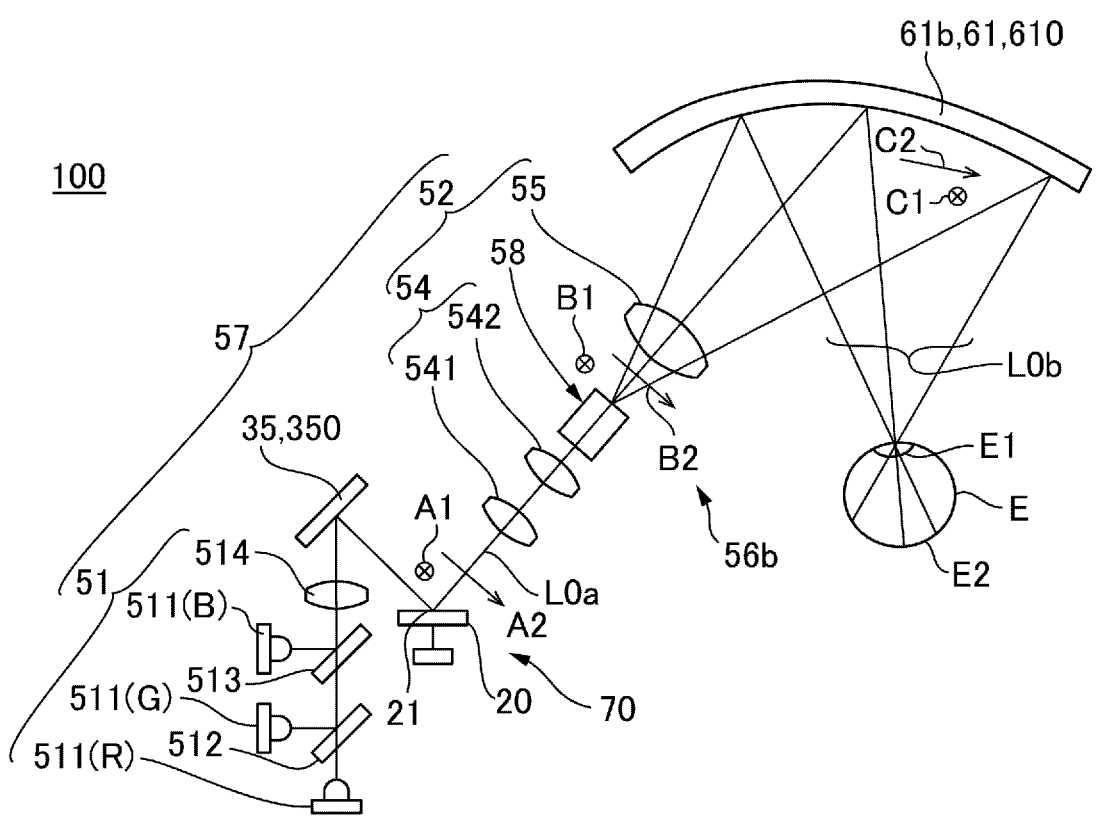
FIG. 2 is an optical system of the display device according to the embodiment.

In FIG. 1, the display device 100 is a head-mounted display device. The display device 100 includes a right-eye image light generation device 56a that emits a laser beam as a light source, a right-eye diffraction element 61a that diffracts the image light emitted from the right-eye image light generation device 56a to a right eye Ea of an observer M, a left-eye image light generation device 56b that emits a laser beam as a light source, and a left-eye diffraction element 61b that diffracts the image light emitted from the left-eye image light generation device 56b to a left eye Eb of the observer M. For example, the display device 100 has a shape similar to the shape of spectacles. Specifically, the display device 100 includes a frame 60 that supports the right-eye image light generation device 56a, the right-eye diffraction element 61a, the left-eye image light generation device 56b, and the left-eye diffraction element 61b. The frame 60 is mounted on the head of the observer. The frame 60 includes a front section 65 that supports the right-eye diffraction element 61a and the left-eye diffraction element 61b. The right-eye image light generation device 56a is disposed on a right temple 62a and the left-eye image light generation device 56b is disposed on a left temple 62b in the frame 60.

Since the right-eye image light generation device 56a and the left-eye image light generation device 56b have similar basic structures, in FIG. 2, only the structure of the left-eye image light generation device 56b is illustrated for description, and illustration of the right-eye image light generation device 56a is omitted. As illustrated in FIG. 2, the left-eye image light generation device 56b includes a light source section 51 that emits a beam of light for displaying an image, a scanning optical system 20 that has a scanning mirror 21 that scans the beam of light emitted from the light source section 51 to form an image, and an optical system 52 that outputs a beam of light LO scanned by the scanning optical system 20 to the left-eye diffraction element 61b. In this embodiment, in the optical system 52, a relay lens system 54 that includes lenses 541 and 542 and a projection lens system 55 are disposed in this order from the scanning optical system 20 toward the left-eye diffraction element 61b. In the optical system 52, a beam diameter expanding element 58 is disposed. The beam diameter expanding element 58 expands the light beam output from the scanning optical system 20 in at least one direction of a first expansion direction B1 that corresponds to a first scanning direction A1 (first incident direction C1) and a second expansion direction B2 that corresponds to a second scanning direction A2 (second incident direction C2).

The light source section 51 emits source light that has not been optically modulated or modulated light that has been optically modulated. In this embodiment, the light source section 51 serves as a modulated light emitting section that emits optically modulated light. More specifically, the light source section 51 includes, as a light source, a red laser device 511(R) that emits red light (R), a green laser device 511(G) that emits green light (G), and a blue laser device 511(B) that emits blue light (B), and also includes two half mirrors 512 and 513, which combine the optical paths of these laser devices, and a collimator lens 514. The red laser device 511(R), the green laser device 511(G), and the blue laser device 511(B) are semiconductor lasers that emit beams of light that are modulated to have light intensities or hues corresponding to respective dots of an image to be displayed under control of a controller (not illustrated).

A scanning optical system 20 scans incident light in the first scanning direction A1 and the second scanning direction A2 that intersects the first scanning direction A1 to generate image light L0b. Consequently, in this embodiment, an image light generation device 70 includes the light source section 51 and the scanning optical system 20. The scanning optical system 20 and the left-eye diffraction element 61b serve as a light guide device 57. The scanning optical system 20 operates under the control of a controller (not illustrated). The scanning optical system 20 can be implemented, for example, by a micromirror device manufactured using a silicon substrate or the like by microelectromechanical systems (MEMS) technology.

The image light L0b emitted from the scanning optical system 20 in the image light generation device 70 is projected toward the left-eye diffraction element 61b via the relay lens system 54 and the projection lens system 55. In this embodiment, the display device 100 is a retinal-scanning-type projection display device. The image light L0b emitted by the scanning optical system 20 in the first scanning direction A1 and the second scanning direction A2, which intersects the first scanning direction A1, is diffracted by the left-eye diffraction element 61b (diffraction element 61) in a first incident direction C1 that corresponds to the first scanning direction A1 and a second incident direction C2 that corresponds to the second scanning direction A2. The image light L0b reaches a retina E2 through a pupil E1 of the left eye Eb, and thereby the observer M recognizes the image.

In this embodiment, the left-eye diffraction element 61b is provided with the first diffraction element 61 that has a reflective volume holographic element 610. The reflective volume holographic element 610 is a partially reflective diffractive optical element, and the right-eye diffraction element 61a and the left-eye diffraction element 61b are partially transmissive reflective combiners. Accordingly, external light also enters the left eye Eb through the left-eye diffraction element 61b (combiner), and the user can recognize a superimposed image consisting of the image light L0a formed by the display device 100 and the external light (background). The first diffraction element 61 has a concave curved surface facing the eye E of the observer, and this structure enables efficient gathering of the image light L0a and propagation toward the eye E of the observer.

Structure of the First Diffraction Element 61

Figure 3:
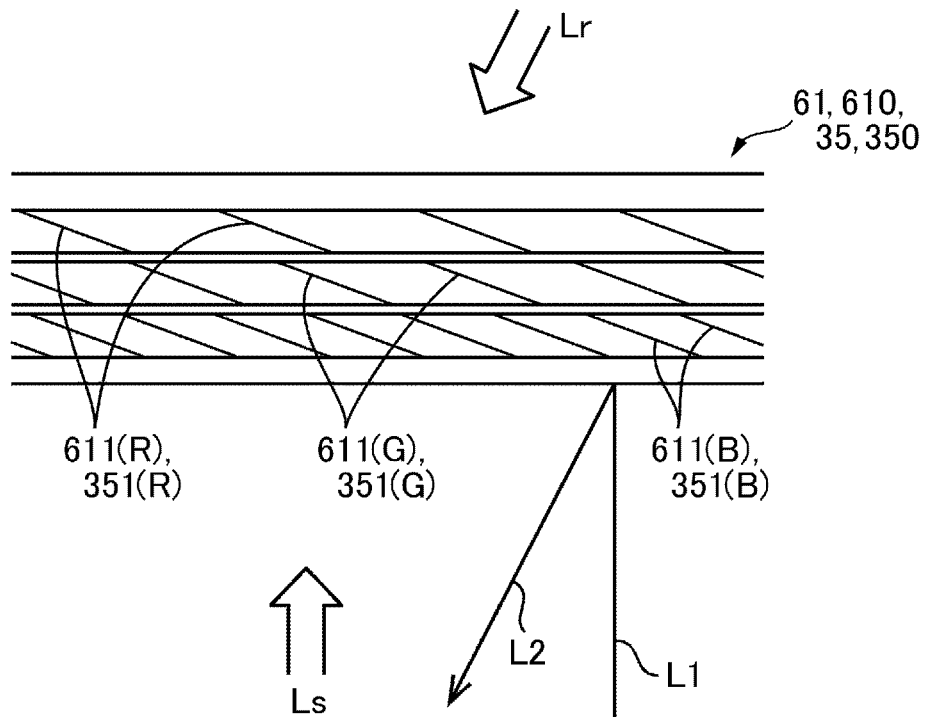
FIG. 3 is a first diffraction element and a second diffraction element in the display device according to the embodiment.
Figure 4:
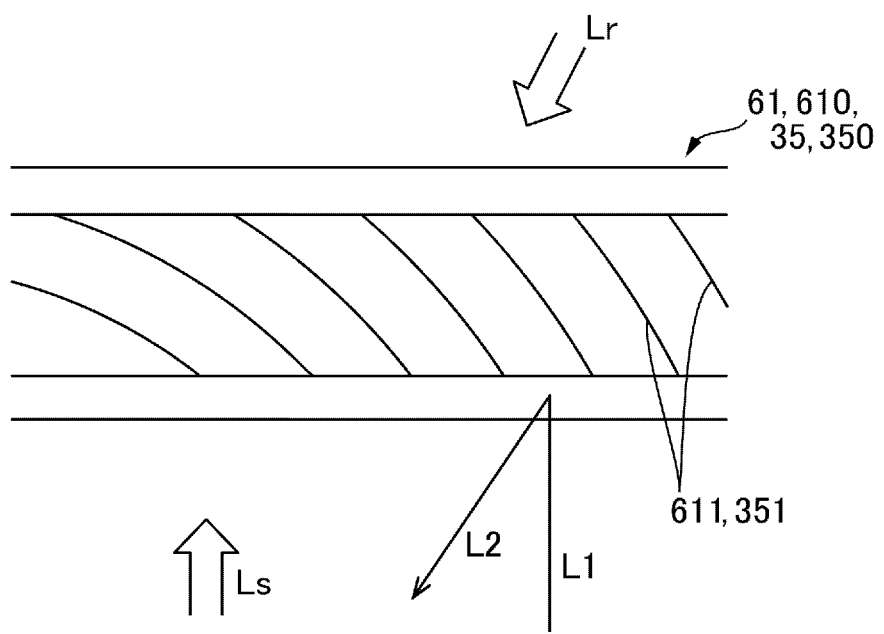
FIG. 4 is the first diffraction element and the second diffraction element corresponding to spherical waves.

FIG. 3 illustrates the first diffraction element 61 and the second diffraction element 35 in the display device 100 according to the embodiment. FIG. 4 illustrates the first diffraction element 61 and the second diffraction element 35 that correspond to spherical waves. In this embodiment, the red light (R), the green light (G), and the blue light (B) enter the first diffraction element 61, and the first diffraction element 61 diffracts and outputs the light of respective colors in predetermined directions. Accordingly, as schematically illustrated in FIG. 3, the first diffraction element 61 has first interference fringes 611(R) that have a pitch corresponding to the wavelength of the red light (R), second interference fringes 611(G) that have a pitch corresponding to the wavelength of the green light (G), and third interference fringes 611(B) that have a pitch corresponding to the wavelength of the blue light (B), the interference fringes being layered in the thickness direction. The pitch corresponding to the wavelength of the red light (R) is longer than the pitch corresponding to the wavelength of the green light (G) and the pitch corresponding to the wavelength of the blue light (B). The pitch corresponding to the wavelength of the green light (G) is longer than the pitch corresponding to the wavelength of the blue light (B). These interference fringes 611 (the first interference fringes 611(R), the second interference fringes 611(G), and the third interference fringes 611(B)) are recorded in respective hologram photosensitive layers as variations in refractive indexes, variations in transmittances, and variations in shapes such as the concave-convex patterns. These interference fringes 611 are inclined in one direction with respect to the incident surface of the first diffraction element 61. Accordingly, the first diffraction element 61 emits the diffraction light L2 that has the highest diffraction efficiency in one direction when a light bean L1 of a single wavelength enters from a direction of a normal.

Such interference fringes 611 can be produced by interference exposure of the holographic photosensitive layers to reference light Lr and object light Ls. If the object light Ls is a plane wave, a plurality of interference fringes 611 are produced in a linearly parallel manner. In FIG. 3, the first interference fringes 611(R), the second interference fringes 611(G), and the third interference fringes 611(B) are formed in different layers, however, a plurality of types of interference fringes may be formed in a single layer. In such a case, the plurality of types of interference fringes are recorded so as to intersect each other.

If the light that enters the first diffraction element 61 is a spherical wave, to perform interference exposure, for example, a spherical wave is used as the object light Ls. As a result, a plurality of curved interference fringes 611 are produced parallel to each other as schematically illustrated in FIG. 4. The interference fringes 611 are curved and the fringes 611 are inclined in one direction with respect to the incident surface of the first diffraction element 61. Accordingly, the first diffraction element 61 emits the diffraction light L2 of the spherical wave that has the highest diffraction efficiency in one direction when the light bean L1 of the spherical wave having a single wavelength enters from a direction of a normal.

Structure of the Second Diffraction Element 35 for Correcting Wavelength Variations In the display device 100 (the left-eye image light generation device 56b) according to the embodiment, when an incident light beam of a predetermined wavelength enters, the first diffraction element 61 diffracts the incident light beam and outputs the light in a predetermined direction. However, even if semiconductor lasers such as the red laser device 511(R), the green laser device 511(G), and the blue laser device 511(B) emit light in a single mode, the light emitted from a semiconductor laser has a certain spectrum width and includes light having wavelengths different from the predetermined wavelength. Furthermore, in some cases, the red laser device 511(R), the green laser device 511(G), and the blue laser device 511(B) are affected by ambient temperatures or other factors and emit light having various wavelengths. In such a case, among the incident light beams, the first diffraction element 61 diffracts the light beams different from the predetermined wavelength in various diffraction directions (output directions), and these variations may result in a decrease in the resolution.

To deal with this problem, the display device 100 and the light guide device 57 according to the embodiment are provided with the second diffraction element 35 in the optical path from the light source section 51 of the image light generation device 70 to the first diffraction element 61. In this embodiment, the second diffraction element 35 is a reflective volume holographic element 350.

The red light (R), the green light (G), and the blue light (B) enter the second diffraction element 35, and the second diffraction element 35 diffracts and outputs the light of respective colors in predetermined directions. Accordingly, as schematically illustrated in FIG. 3, similarly to the first diffraction element 61, the second diffraction element 35 has first interference fringes 351(R) that have a pitch corresponding to the wavelength of the red light (R), second interference fringes 351(G) that have a pitch corresponding to the wavelength of the green light (G), and third interference fringes 351(B) that have a pitch corresponding to the wavelength of the blue light (B), the interference fringes being layered in the thickness direction. In the second diffraction element 35, similarly to the first diffraction element 61, the pitch corresponding to the wavelength of the red light (R) is longer than the wavelength of the green light (G) and the pitch corresponding to the wavelength of the blue light (B). The pitch corresponding to the wavelength of the green light (G) is longer than the pitch corresponding to the wavelength of the blue light (B). These interference fringes 351 (the first interference fringes 351(R), the second interference fringes 351(G), and the third interference fringes 351(B)) are recorded in respective hologram photosensitive layers as variations in refractive indexes, variations in transmittances, and variations in shapes such as the concave-convex patterns, similarly to the interface fringes 611. These interference fringes 351 are inclined in one direction with respect to the incident surface of the first diffraction element 61. Accordingly, similarly to the first diffraction element 61, the second diffraction element 35 emits the diffraction light L2 that has the highest diffraction efficiency in one direction when the light beam L1 of the single wavelength enters from a direction of a normal. The interference fringes 351 are produced by interference exposure of the holographic photosensitive layers to the reference light Lr and the object light Ls, similarly to the interference fringes 611. If the object light Ls is a plane wave, a plurality of interference fringes 351 are produced in a linearly parallel manner. In the second diffraction element 35, similarly to the first diffraction element 61, in some cases, a plurality of interference fringes are produced in a single layer.

If the light that enters the second diffraction element 35 is a spherical wave, to perform interference exposure, a spherical wave is used as the object light Ls. As a result, curved interference fringes 351 are produced as schematically illustrated in FIG. 4. The interference fringes 351 are curved and the interference fringes 351 are inclined in one direction with respect to the incident surface of the second diffraction element 35.

Since the second diffraction element 35 is provided to reduce the variations in the wavelengths in the first diffraction element 61, the pitches of the interference fringes 351 (the first interference fringes 351(R), the second interference fringes 351(G), and the third interference fringes 351(B)) of the second diffraction element 35 are the same as the pitches of the interference fringes 611 (the first interference fringes 611(R), the second interference fringes 611(G), and the third interference fringes 611(B)) of the first diffraction element 61 respectively. The pitches of the interference fringes 351 and 611 are the same in the in-plane direction in the first diffraction element 61 and the second diffraction element 35. It should be noted that in the first diffraction element 61, the pitches of the interference fringes 611 may be different in the in-plane direction. For example, in the first diffraction element 61, angles for diffracting the image light L0b so as to allow the image light L0b to enter the eye of the observer are different in the central part and in the end parts, and accordingly, the pitches of the interference fringes 611 may be changed differently to correspond to the difference in the angles. In such a case, it is preferable that the pitches of the interference fringes 611 in the first diffraction element 61 be within the range between half to twice the pitches of the interference fringes 351 in the second diffraction element 35.

Light Guide Device 57

Figure 5:
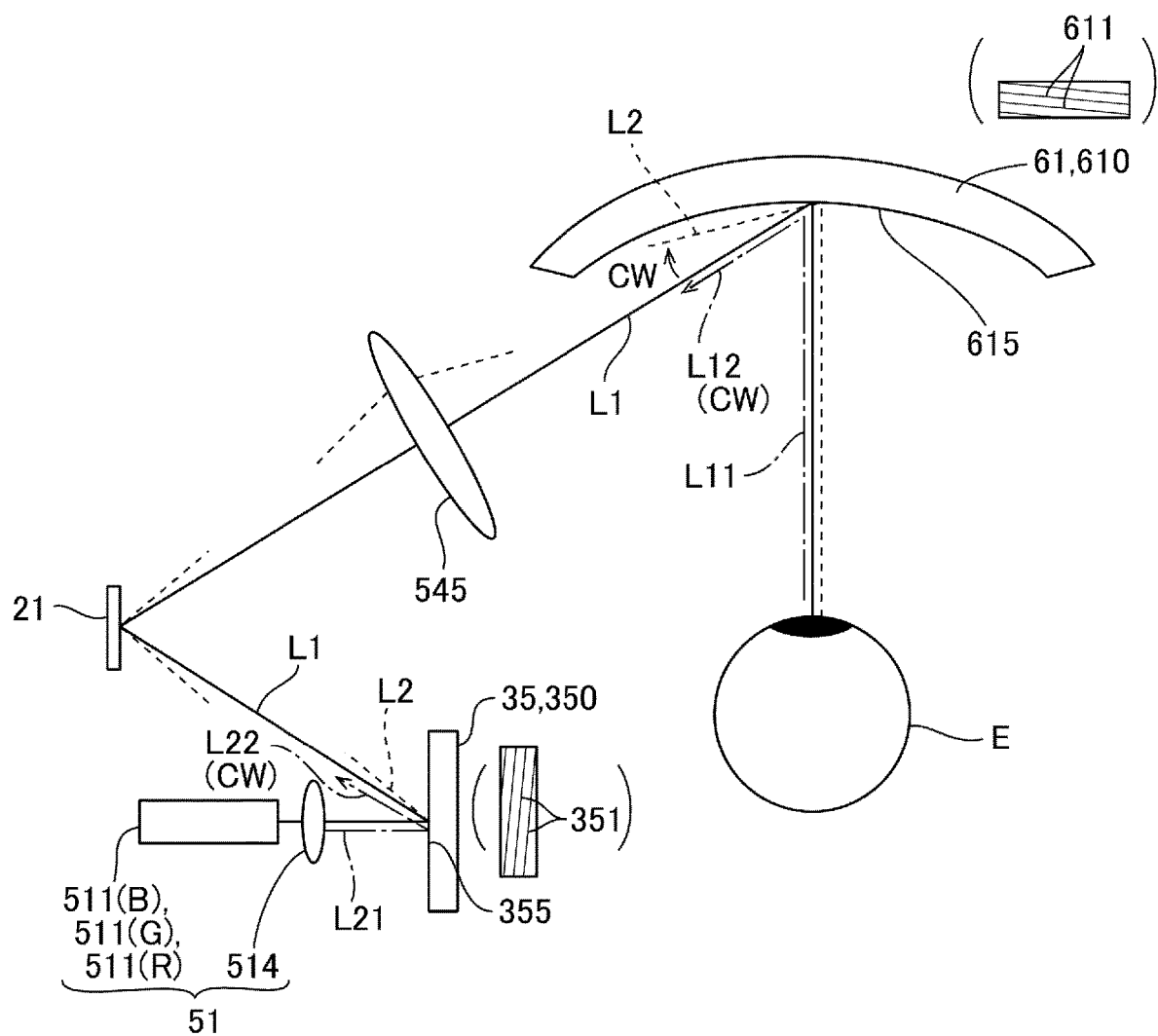
FIG. 5 is the first diffraction element and the second diffraction element in the display device according to the embodiment.

FIG. 5 illustrates the first diffraction element 61 and the second diffraction element 35 in the display device 100 according to the embodiment. In FIG. 5, light beams having wavelengths optimum for the interference fringe pitches of the first diffraction element 61 and the second diffraction element 35 are indicated by solid lines, and light beams having wavelengths varied to longer wavelengths than the optimum wavelengths are indicated by dotted lines. Furthermore, FIG. 5 schematically illustrates the inclination directions of the interference fringes 351 and 611.

As illustrated in FIG. 5, in this embodiment, the scanning mirror 21 and an intermediate image generation lens 545 are disposed between the second diffraction element 35 and the first diffraction element 61, and between the second diffraction element 35 and the first diffraction element 61, the reflection by the scanning mirror 21 and the generation of an intermediate image by the intermediate image generation lens 545 are performed. As indicated by the alternate long and short dashed line L11 in FIG. 5, when a light beam enters from a direction of a normal to the first incident plane 615 of the first diffraction element 61, diffraction light (alternate long and short dashed line L12) that has highest diffraction efficiency is output in a direction inclined to a clockwise CW side with respect to the direction of the normal to the first incident plane 615. As indicated by the alternate long and short dashed line L21 in FIG. 5, when a light beam enters from a direction of a normal to the second incident plane 355 of the second diffraction element 35, diffraction light (alternate long and short dashed line L22) that has highest diffraction efficiency is output in a direction inclined to the clockwise CW side with respect to the direction of the normal to the second incident plane 355. Such a structure is implemented by providing the interference fringes 611 and the interference fringes 351 such that the inclination direction of the interference fringes 611 and the inclination direction of the interference fringes 351 are the same, the inclination directions have been described with reference to FIG. 3.

In this structure, with respect to a case in which a light beam (solid line L1) of an optimum wavelength enters from a direction of a normal to the second incident plane 355 of the second diffraction element 35, a diffraction light (dotted line L2) produced when a light beam of a wavelength longer than the optimum wavelength enters is inclined toward the clockwise CW side. Accordingly, when light enters the first incident plane 615 of the first diffraction element 61 via the scanning mirror 21 and the intermediate image generation lens 545, the diffraction light of the light beam that has the wavelength longer than the optimum wavelength enters from the side inclined toward the clockwise CW side compared with the light beam of the optimum wavelength. Consequently, the light beam of the optimum wavelength and the light beam of the wavelength longer than the optimum wavelength are output in the same direction from the first diffraction element 61, and thereby the decrease in resolution can be reduced.

Diffraction Characteristics of the First Diffraction Element 61 and the Second Diffraction Element 35

Figure 6A:
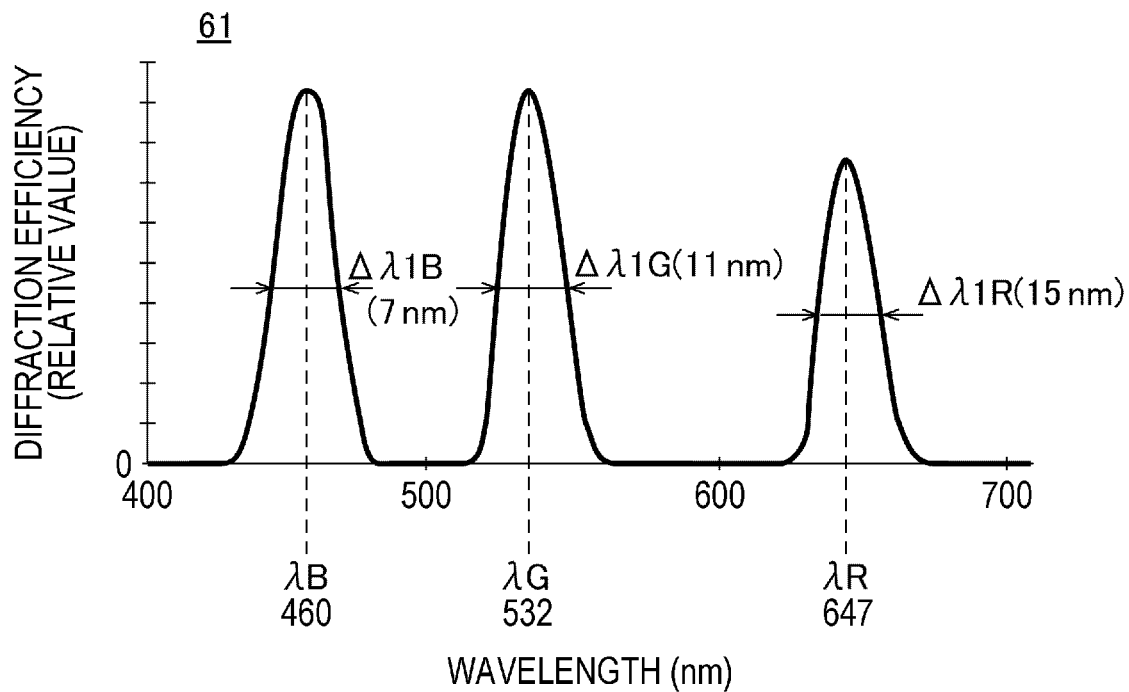
FIGS. 6A and 6B are diffraction characteristics of the first diffraction element and the second diffraction element in the display device according to the embodiment.
Figure 6B:
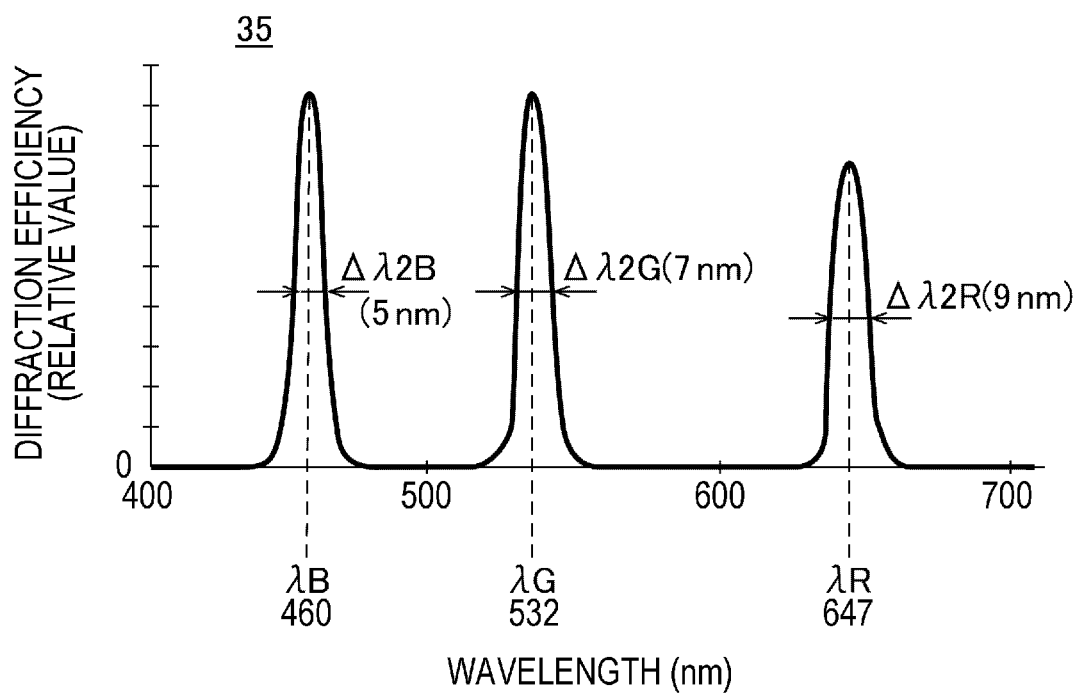

FIGS. 6A and 6B illustrate diffraction characteristics of the first diffraction element 61 and the second diffraction element 35 in the display device 100 according to the embodiment. FIG. 6A illustrates the diffraction characteristics of the first diffraction element 61 and FIG. 6B illustrates the diffraction characteristics of the second diffraction element 35. FIG. 7 illustrates a wavelength shift occurred in the first diffraction element 61 in FIG. 5 and other drawings; the wavelength width at the half value in diffraction efficiency is wider in the first diffraction element 61. FIG. 8 illustrates another wavelength shift occurred in the first diffraction element 61 in FIG. 5 and other drawings; the wavelength width at the half value in diffraction efficiency is narrower in the first diffraction element 61.

As illustrated in FIGS. 6A and 6B, the first diffraction element 61 and the second diffraction element 35 in the display device 100 according to the embodiment diffract the light which includes blue light in a wavelength range of 400 to 500 nm, green light in a wavelength range of 500 to 580 nm, and red light in a wavelength range of 580 to 700 nm. One of the blue wavelength range, the green wavelength range, and the red wavelength range corresponds to a "first wavelength range", another wavelength range corresponds to a "second wavelength range", and the other wavelength range corresponds to a "third wavelength range" in this embodiment. In this embodiment, for convenience, the green wavelength range is referred to as a first wavelength range $\lambda G$, the blue wavelength range is referred to as a second wavelength range $\lambda B$, and the red wavelength range is referred to as a third wavelength range $\lambda R$.

In the first diffraction element 61 and the second diffraction element 35 having such structures, in this embodiment, the first diffraction element 61 and the second diffraction element 35 have the same wavelength at which diffraction efficiency with respect to the light in the first wavelength range $\lambda G$ is maximum, and have different wavelength widths at the half value in diffraction efficiency with respect to the light in the first wavelength range $\lambda G$. The first diffraction element 61 and the second diffraction element 35 have the same wavelength at which diffraction efficiency with respect to the light in the second wavelength range λB is maximum, but have different wavelength widths at the half value in diffraction efficiency with respect to the light in the second wavelength range λB. Furthermore, the first diffraction element 61 and the second diffraction element 35 have the same wavelength at which diffraction efficiency with respect to the light in the third wavelength range λR is maximum, and have different wavelength widths at the half value in diffraction efficiency with respect to the light in the third wavelength range λR.

In this embodiment, the first diffraction element 61 is thinner and larger than the second diffraction element 35. Accordingly, in the first diffraction element 61, the wavelength at which diffraction efficiency is maximum tends to be shifted compared with the second diffraction element 35 due to variations in shrinkage ratio of the hologram material in the exposure step in manufacturing the first diffraction element 61. Especially, since the first diffraction element 61 is larger than the second diffraction element 35 to endure the display angle of view, the first diffraction element 61 is more susceptible to changes in the environment (temperature) than the second diffraction element 35 and wavelength shifts tend to occur due to changes in the environment (temperature). Furthermore, since the first diffraction element 61 is exposed to the outside, the first diffraction element 61 is more susceptible to changes in the environment (temperature) than the second diffraction element 35 and wavelength shifts tend to occur due to changes in the environment (temperature). To solve the problems, the first diffraction element 61 has wider wavelength widths than the second diffraction element 35 at the half value in diffraction efficiency with respect to the light in the first wavelength range λG, the second wavelength range λB, and the third wavelength range λR. With such a structure, as will be described in the following evaluation result, a decrease in intensity of the light diffracted by the second diffraction element 35 and the first diffraction element 61 can be reduced even if a wavelength shift occurs.

In the following evaluation, the first diffraction element 61 having a thickness of 8 μm was formed so as to correspond to lasers having wavelengths of 460 nm, 532 nm, and 647 nm, and the second diffraction element 35 having a thickness of 15 μm was formed so as to correspond to lasers having wavelengths of 460 nm, 532 nm, and 647 nm. As illustrated in FIGS. 6A and 6B, the first diffraction element 61 had a wavelength width Δλ1G of 11 nm at the half value of diffraction efficiency with respect to the light in the first wavelength range λG and the second diffraction element 35 had a wavelength width Δλ2G of 7 nm at the half value in diffraction efficiency with respect to the light in the first wavelength range λG. The first diffraction element 61 had a wavelength width Δλ1B of 7 nm at the half value in diffraction efficiency with respect to the light in the second wavelength range λB and the second diffraction element 35 had a wavelength width Δλ2B of 5 nm at the half value in diffraction efficiency with respect to the light in the second wavelength range λB. Furthermore, the first diffraction element 61 had a wavelength width Δλ1R of 15 nm at the half value in diffraction efficiency with respect to the light in the third wavelength range λR and the second diffraction element 35 had a wavelength width Δλ2R of 9 nm at the half value in diffraction efficiency with respect to the light in the third wavelength range λR.

The upper section and the lower section in FIG. 7 show a wavelength shift in which, from the above-mentioned state, the wavelength at which diffraction efficiency with respect to the light in the first wavelength range λG in the first diffraction element 61 was maximum was shifted by 5 nm, whereas a wavelength at which diffraction efficiency with respect to the light in the first wavelength range λG in the second diffraction element 35 was maximum was kept without fluctuations. In this case, if the diffraction efficiency (corresponding to the area of the diagonally shaded part in FIG. 7) achieved by the combination of the second diffraction element 35 and the first diffraction element 61 when no wavelength shift occurred (state shown in the upper section in FIG. 7) is 100%, the diffraction efficiency (corresponding to the area of the diagonally shaded part in FIG. 7) achieved by the combination of the second diffraction element 35 and the first diffraction element 61 when the wavelength shift occurred (state shown in the lower section in FIG. 7) is 68%.

In contrast, for example, as illustrated in the lower section in FIG. 8, when the first diffraction element 61 had the wavelength width Δλ1G of 5 nm at the half value in diffraction efficiency with respect to the light in the first wavelength range λG and the second diffraction element 35 had the wavelength width Δλ2G of 7 nm at the half value of diffraction efficiency with respect to the light in the first wavelength range λG, the intensity of the light after the occurrence of the wavelength shift decreased greatly. More specifically, if the diffraction efficiency (corresponding to the area of the diagonally shaded part in FIG. 8) achieved by the combination of the second diffraction element 35 and the first diffraction element 61 when no wavelength shift occurred (state shown in the upper section in FIG. 8) is 100%, the diffraction efficiency (corresponding to the area of the diagonally shaded part in FIG. 8) achieved by the combination of the second diffraction element 35 and the first diffraction element 61 when the wavelength shift occurred (state shown in the lower section in FIG. 8) decreased to 38%.

In this embodiment, the wavelength widths Δλ2B and Δλ2R of the first diffraction element 61 are wider than those of the second diffraction element 35 at the half value of diffraction efficiency with respect to the light in the second wavelength range λB and the third wavelength range λR. Accordingly, in the first diffraction element 61, even if the wavelength at which diffraction efficiency with respect to the light in the second wavelength range λB and the third wavelength range λR is maximum is shifted, the decrease in diffraction efficiency achieved by the combination of the second diffraction element 35 and the first diffraction element 61 can be reduced.

Main Effects of this Embodiment

As described above, in the first diffraction element 61 and the second diffraction element 35 in the display device 100 according to the embodiment, the wavelength width Δλ1G at the half value of diffraction efficiency in the first wavelength range λG of the first diffraction element 61 is wider than the wavelength width Δλ2G at the half value of diffraction efficiency in the first wavelength range λG of the second diffraction element 35. Accordingly, even if the wavelength at which diffraction efficiency with respect to the light in the first wavelength range λG of the first diffraction element 61 is maximum is shifted, the decrease in diffraction efficiency achieved by the combination of the second diffraction element 35 and the first diffraction element 61 can be reduced. Furthermore, the wavelength width Δλ1B and the wavelength width Δλ1R at the half value of diffraction efficiency in the second wavelength range λB and the third wavelength range λR of the first diffraction element 61 are wider than the wavelength width Δλ2B and Δλ2R at the half value of diffraction efficiency in the second wavelength range λB and the third wavelength range λR of the second diffraction element 35. Accordingly, even if the wavelength at which diffraction efficiency with respect to the light in the second wavelength range λB and the third wavelength range λR of the first diffraction element 61 is maximum is shifted, the decrease in diffraction efficiency achieved by the combination of the second diffraction element 35 and the first diffraction element 61 can be reduced and thereby the darkening of images can be prevented.

In this embodiment, the first diffraction element 61 is thinner and larger than the second diffraction element 35. With this structure, since the first diffraction element 61 is thin and large, the wavelength at which diffraction efficiency is maximum tends to be shifted compared with the second diffraction element 35 due to variations in shrinkage ratio of the hologram material in the exposure step in manufacturing the first diffraction element 61, influence of change in temperature in the environment in which the display device 100 is used, and the like. According to the embodiment, however, even if such a wavelength shift occurs, the decrease in diffraction efficiency achieved by the combination of the second diffraction element 35 and the first diffraction element 61 can be reduced and thereby the darkening of images can be prevented.

Other Embodiments

In the above-described embodiment, as an example, the first diffraction element 61 and the second diffraction element 35 are provided as the deflection members. Alternatively, as long as the display device 100 is provided with the first diffraction element 61 and the second diffraction element 35, the present embodiment can be applied. In such a case, by widening a wavelength width at the half value of diffraction efficiency in the diffraction element in which the wavelength at which diffraction efficiency is maximum tends to be shifted more easily due to the thickness or the size, the decrease in diffraction efficiency achieved by the combination of the second diffraction element 35 and the first diffraction element 61 can be reduced and thereby the darkening of images can be prevented. In the above-described embodiment, the left-eye image light generation device 56b includes the light source section 51 and the scanning optical system 20. Alternatively, the left-eye image light generation device 56b may be a liquid crystal panel, an organic electroluminescence display panel, or a display panel that uses a micromirror.

The entire disclosure of Japanese Patent Application No. 2016-228638, filed Nov. 25, 2016 is expressly incorporated by reference herein.

What is claimed is:

1. A display device configured to deflect light emitted from a light source section, comprising:
   a first diffraction element;
   a second diffraction element that is disposed in an optical path from the light source section to the first diffraction element;
   an intermediate image generation lens provided in the optical path between the second diffraction element and the first diffraction element, generation of an intermediate image being performed by the intermediate image generation lens and being generated between the second diffraction element and the first diffraction element; and
   a scanning element provided in the optical path between the second diffraction element and the first diffraction element, the scanning element provided closer to the second diffraction element than the intermediate image generation lens is to the second diffraction element,
   wherein the second diffraction element diffracts light from the light source section toward the first diffraction element, and the first diffraction element receives the light diffracted by the second diffraction element,
   wherein the first diffraction element has a concave curved surface configured to face an eye of an observer, and
   wherein the first diffraction element is thinner and larger than the second diffraction element, and the first diffraction element has wider wavelength widths at a half value in diffraction efficiency with respect to the light in a first, second and third wavelength range than the second diffraction element, the first, second and third wavelength ranges being different from each other.

2. The display device according to claim 1, wherein each of the first diffraction element and the second diffraction element has a plurality of interference fringes with different pitches.

3. A display device configured to deflect light emitted from a light source section, comprising:
   a first diffraction element;
   a second diffraction element that is disposed in an optical path from the light source section to the first diffraction element;
   an intermediate image generation lens provided in the optical path between the second diffraction element and the first diffraction element, generation of an intermediate image being performed by the intermediate image generation lens and being generated between the second diffraction element and the first diffraction element; and
   a scanning element provided in the optical path between the second diffraction element and the first diffraction element, the scanning element provided closer to the second diffraction element than the intermediate image generation lens is to the second diffraction element,
   wherein each of the first diffraction element and the second diffraction element has a plurality of interference fringes with different pitches,
   wherein each of the plurality of interference fringes of the first diffraction element corresponds in pitch to a respective interference fringe of the second diffraction element,
   wherein the first diffraction element has a concave curved surface configured to face an eye of an observer, and
   wherein the first diffraction element is thinner and larger than the second diffraction element, and the first diffraction element has wider wavelength widths at a half value in diffraction efficiency with respect to the light in a first, second and third wavelength range than the second diffraction element, the first, second and third wavelength ranges being different from each other.

4. A display device configured to deflect light emitted from a light source section, comprising:
   a first diffraction element;
   a second diffraction element that is disposed in an optical path from the light source section to the first diffraction element;
   an intermediate image generation lens provided in the optical path between the second diffraction element and the first diffraction element, generation of an intermediate image being performed by the intermediate image generation lens and being generated between the second diffraction element and the first diffraction element; and a scanning element provided in the optical path between the second diffraction element and the first diffraction element, the scanning element provided closer to the second diffraction element than the intermediate image generation lens is to the second diffraction element, wherein the second diffraction element diffracts light from the light source section toward the first diffraction element, and the first diffraction element receives the light diffracted by the second diffraction element, and wherein the first diffraction element is thinner and larger than the second diffraction element, and the first diffraction element has wider wavelength widths at a half value in diffraction efficiency with respect to the light in a first, second and third wavelength range than the second diffraction element, the first, second and third wavelength ranges being different from each other.

* * * * *